(12) United States Patent
Smith et al.

(10) Patent No.: US 7,231,441 B2
(45) Date of Patent: Jun. 12, 2007

(54) VIRTUAL BEACON SYSTEM

(75) Inventors: Mark T. Smith, San Mateo, CA (US); Salil Vjaykumar Pradhan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 771 days.

(21) Appl. No.: 10/192,502

(22) Filed: Jul. 10, 2002

(65) Prior Publication Data

US 2002/0178220 A1 Nov. 28, 2002

Related U.S. Application Data

(63) Continuation-in-part of application No. 09/836,924, filed on Apr. 17, 2001.

(51) Int. Cl.
*G06F 15/173* (2006.01)

(52) U.S. Cl. .................... 709/224; 709/225; 709/229; 709/238; 709/217; 455/456.2; 455/456.3; 455/466; 348/143; 345/156

(58) Field of Classification Search ................ 709/200, 709/225, 229, 238; 707/100–102, 3; 345/156; 705/14; 348/143
See application file for complete search history.

(56) References Cited

U.S. PATENT DOCUMENTS

| | | | | |
|---|---|---|---|---|
| 5,930,721 A | * | 7/1999 | Fried et al. ................. | 455/466 |
| 6,029,195 A | * | 2/2000 | Herz ........................... | 725/116 |
| 6,122,520 A | | 9/2000 | Want et al. | |
| 6,408,189 B1 | * | 6/2002 | Nakamura et al. .......... | 455/504 |
| 6,549,768 B1 | * | 4/2003 | Fraccaroli ................ | 455/456.3 |
| 6,571,279 B1 | * | 5/2003 | Herz et al. ................... | 709/217 |
| 2002/0140745 A1 | * | 10/2002 | Ellenby et al. ............. | 345/848 |
| 2002/0147701 A1 | * | 10/2002 | Chang .......................... | 707/1 |
| 2006/0019676 A1 | * | 1/2006 | Miller et al. ............. | 455/456.2 |

OTHER PUBLICATIONS

Pradhan, Salil et al., "Websigns: Hyperlinking Physical Locations to the Web," I.E.E.E., 2001, pp. 42-48.
Want, Roy et al., "Bridging Physical and Virtual Worlds with Electronic Tags," CHI 99 May 15-20, 1999, pp. 370-377.
Tarumi, Hiroyuki et al., "SpaceTag: An Overlaid Virtual System and its Applications," Graudate School of Informatics, Kyoto University, Japan.

(Continued)

*Primary Examiner*—Yves Dalencourt

(57) ABSTRACT

A system for providing information about physical entities to users includes an information server accessible to a plurality of user-held receivers. An exemplary server has access to characteristic accessibility data for candidate physical entities. The server receives a user's request for information about physical entities of interest (which may be mobile), including the user's search domain relative to the user's location (the user may also be mobile). The search domain does not necessarily require the user to provide a network address of, or perform a keyword search for the networked data pages of, the physical entities of interest. The server determines which (if any) of said candidate physical entities satisfy the request, and reports to the user at the receiver over an electronic network.

46 Claims, 9 Drawing Sheets

OTHER PUBLICATIONS

C. Crouch, http://www.cnn.com/2001/TECH/ptech/04/20/location.services.idg/, "Will Big Brother Track You By Cell Phone?", Apr. 20, 2001, pp. 1-4.

C. Oakes, http://www.wired.com/new s/technology/0,1282,20504,00.html, "Zeroing In On Cell-Phone 911s," Jun. 30, 1999, pp. 1-3.

M. Stroud, http://www.wired.com/new s/wireless/0,1382,50205,00.html, "Have Cell Phone, Will Shoot," Feb. 8, 2002, pp. 1-3.

"Mobile Commerce," PDS Consulting Short Paper, Jun. 7, 2002.

M. Cohn, http://www.internetworld.com/new s.php?inc=mcw/02072002c.html, "Motorola Puts Food on the Menu," Feb. 7, 2002, pp. 1-2.

Schaumburg, http://www.motorola.com/mobileinternet/whatsnew_detail/0,2351,107,_16,00.html, "Motorola and Food.com Unite," Jan. 14, 2002, pp. 1-3.

* cited by examiner

VIRTUAL BEACON SYSTEM

CROSS REFERENCE TO RELATED APPLICATION

This is a continuation-in-part of a co-pending U.S. application entitled "Creating a Virtual Link between a Physical Location and Its Web Representation," Ser. No. 09/836,924, filed on Apr. 17, 2001, which is hereby incorporated by reference for all purposes.

BACKGROUND

Many physical entities (e.g., companies, businesses, individuals, facilities, objects, etc.) have a virtual presence on the internet via web pages that are accessible via wired and/or wireless communication networks. Typically, a web site contains multiple web pages providing information about one or more physical entities. For example, the Hewlett Packard Company has its own web site (www.hp.com) containing web pages that provide information about the company, such as its locations, products, services, etc. A physical entity's web pages generally may be accessed using their web address(es) or URL(s) (Uniform Resource Locator) via a web browser (e.g., Microsoft Explorer).

Typically, in order to access a web page, a user has to either enter the exact web address for the web page into a web browser or obtain a hyperlink to that web page. In the former case, the user has to memorize the web address, which may sometimes be long and/or unintuitive. In the latter case, the hyperlink to a web page may be obtained by performing a conventional search using a search engine (e.g., Google, Yahoo, Excite, etc.) and relevant key words. However, the user has to know the relevant key words to obtain an effective search result. Further, after obtaining a search result, the user has to browse the search results to find the desired web page, which is time-consuming and may be unpractical—especially if using a small portable computing device (e.g., a personal digital assistant (PDA)).

Thus, it is desirable for a user to easily access one or more web pages of a physical entity without having to memorize web address(es) or perform a conventional search therefor. Easy access to web pages is particularly desirable when the user is traveling. For example, when a user is driving near one or more restaurants, it would be desirable for the user to easily access the web pages for the restaurant(s) to see its/their hours, menu, and/or prices.

One known solution is to place a physical beacon that broadcasts a physical entity's web address to users having broadcast receivers. See, for example, U.S. Pat. Nos. 6,292,744, 6,241,364, and 6,216,087. Typically, the physical beacon is placed near the physical entity and has a limited range where a user may receive the broadcast. One drawback of a physical beacon is the need to physically maintain the beacon. In addition, if the web address of the physical entity has changed, the physical beacon generally will have to be physically reconfigured.

Thus, a market exists for an apparatus that allows a user to easily access web pages corresponding to physical entities without necessarily requiring the use of a physical beacon.

SUMMARY

A system for providing information about physical entities to users includes an information server and a plurality of user-held receivers.

An exemplary method for operating the server includes: (a) obtaining characteristic accessibility data for candidate physical entities, at least one of which is mobile; (b) obtaining a user's request for information about one or more physical entities of interest, the request including a search domain relative to the user's location, and without necessarily requiring the user to provide a network address of, or perform a keyword search for the networked data pages of, the physical entities of interest; (c) determining which (if any) of the candidate physical entities satisfy the request; and (d) reporting to the user over an electronic network.

An exemplary method for operating a receiver includes: (a) formulating a request for one or more physical entities of interest, the request being expressed in terms of characteristic ranging data of the receiver, and including the search domain relative to the receiver's location; (b) transmitting the request to the server having the characteristic accessibility data for the candidate physical entities; and (c) receiving from the server those candidate physical entities which satisfy the request.

Exemplary devices implementing the above methods, as well as alternative or additional aspects and embodiments, are also disclosed.

DETAILED DESCRIPTION

I. Overview

The techniques described herein provide virtual links between physical entities and their respective web addresses and/or URLs. In an exemplary embodiment, the virtual links are provided by a "virtual beacon" system. A user using a receiver may obtain information (e.g., web addresses such as URLs, etc.) about one or more physical entities via the virtual beacon system. Of course, the virtual beacon system and various embodiments described herein do not strictly exclude the use of a physical beacon, but merely eliminate the necessity of using a physical beacon. For example, physical beacons could still be used for redundancy or some other purposes.

II. A Virtual Beacon System

Figure 1:
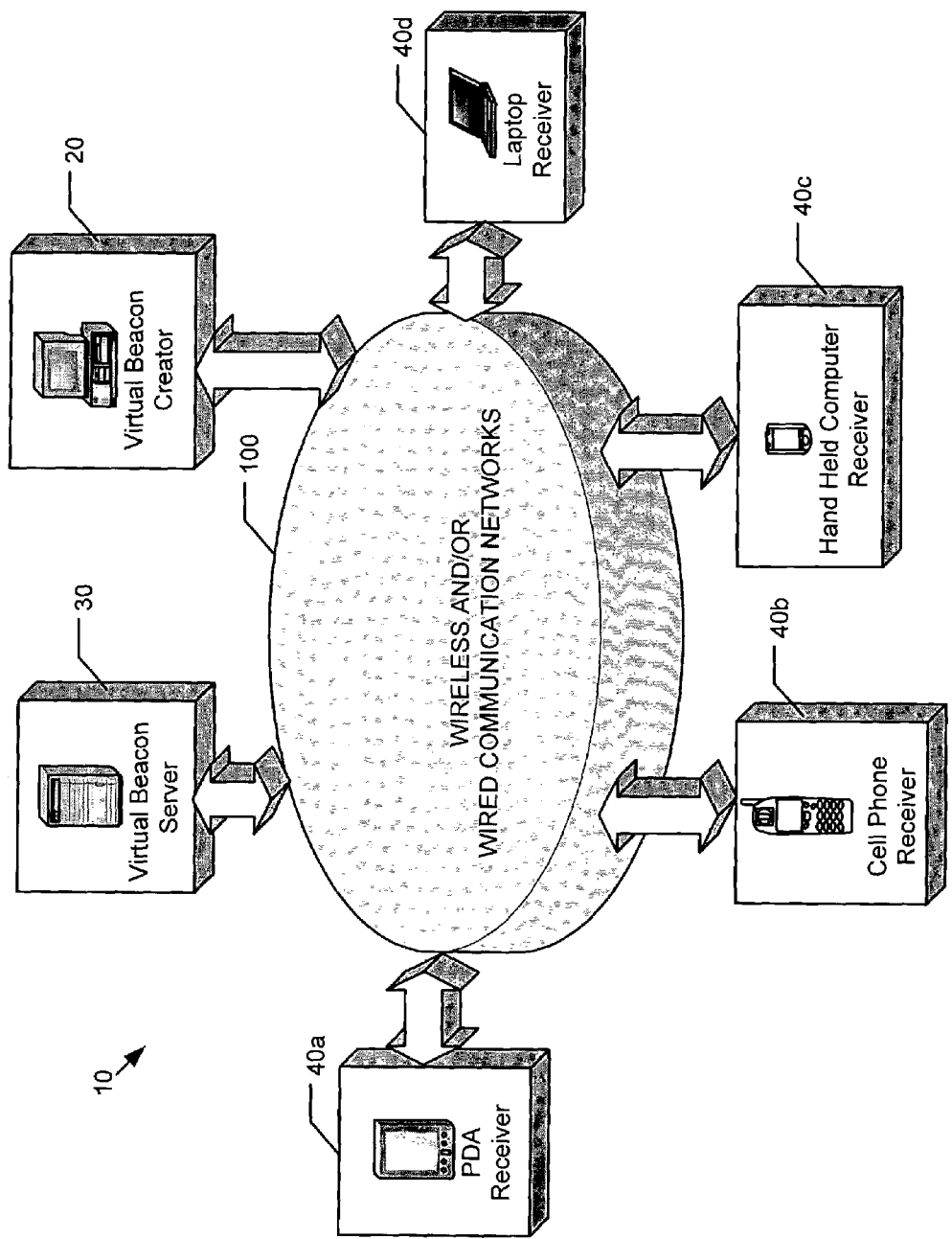
FIG. 1 illustrates a block diagram of an exemplary virtual beacon system.

FIG. 1 illustrates an exemplary virtual beacon system 10 in accordance with an exemplary embodiment. The virtual beacon system 10 includes a virtual beacon creator 20, a virtual beacon server 30, and multiple receivers (e.g., a PDA receiver 40*a*, a cellular phone receiver 40*b*, a hand held computer receiver 40*c*, and/or a laptop computer receiver 40*d*, etc.) connected via wireless and/or wired communication networks 100. The wireless and/or wired communication networks 100 are also connected to multiple servers and other computing devices (not shown).

A physical entity may have one or more web pages that provide information about that physical entity. Such web pages are generally accessible to computing devices equipped with web browsing software and are connected to the wireless and/or wired communication networks 100. web pages are usually stored in one or more servers that are connected to the wireless and/or wired communication networks 100.

In an exemplary embodiment, one or more electronic files are created by the virtual beacon creator 20 to establish the links between physical entities and their corresponding web pages. For example, and without limitation, one electronic file may be created per physical entity. The electronic files are sent by the virtual beacon creator 20 to the virtual beacon server 30 (e.g., they may be to be stored in a database or memory that is accessible by the virtual beacon server 30). Once such files are stored in the virtual beacon server, the entities become candidates for requests by users at their receivers.

When the virtual beacon server 30 receives a request from a receiver 40 via the wireless and/or wired communication networks 100, the virtual beacon server 30 searches the database or other memory and returns relevant electronic files to the receiver 40. Thus, a user at the receiver 40 is able to access the web pages corresponding to one or more physical entities (i.e., for a subset of the candidate physical entities) without having to necessarily memorize the web address(es) or perform a conventional web search. Various components of the virtual beacon system 10 will be described in more detail herein.

A. The Virtual Beacon Creator

Figure 2:
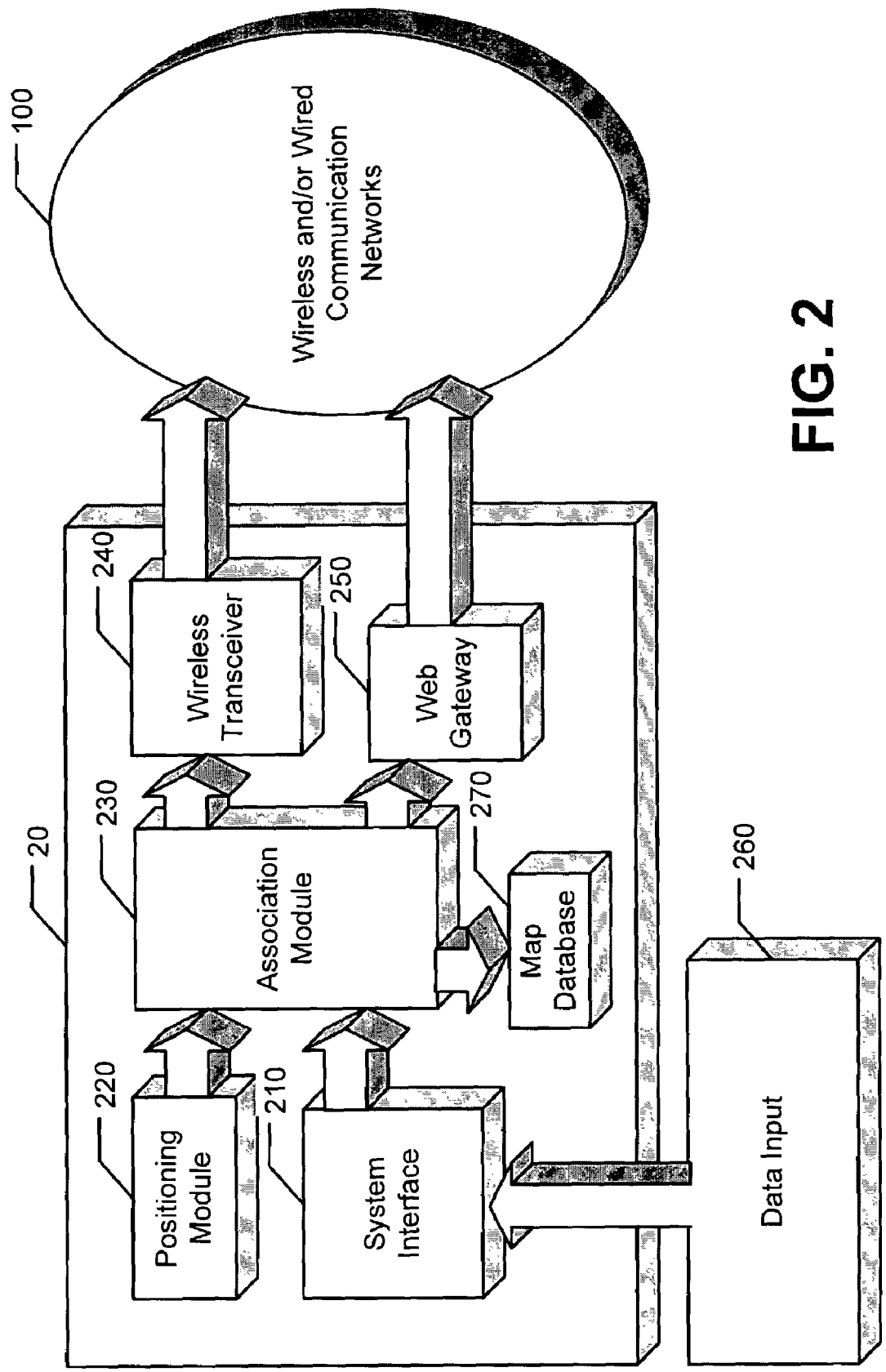
FIG. 2 illustrates a block diagram of an exemplary virtual beacon creator.

FIG. 2 illustrates an exemplary virtual beacon creator 20. The exemplary virtual beacon creator 20 includes a system interface 210, a positioning module 220, an association module 230, a wireless transceiver 240, and a web gateway 250.

1. The System Interface; Accessibility Data

In an exemplary embodiment, the system interface 210 is configured to receive data inputs 260. The data inputs 260 may include positional data, virtual access range data, web address/URL data, tag/label data, operation time data, and/or other characteristic data relating to accessibility of the candidate physical entities. Such data may be entered via the system interface 210 by service providers, physical entity personnel, individual users via the receivers 40, and/or other entities. These exemplary data types will be described in more detail below. In another embodiment, some or all of the data may be automatically generated by the virtual beacon creator 20.

Typically, positional data provides information about the physical entity's location. In an exemplary embodiment, positional data may include positional coordinates (i.e., longitudinal and/or latitudinal data) and/or the street address of a physical entity. If a street address is provided, in one aspect, the virtual beacon creator 20 may have access to a map database 270, which may be located either within the virtual beacon creator 20 or remotely (not shown), for converting the street address to its associated positional coordinates.

In an exemplary embodiment, the virtual access range data provides an area limitation (e.g., a 2000 feet radius around the physical entity) within which a user may be able to receive information about a physical entity. A physical entity may specify a virtual access range value (i.e., the virtual access range data are entity specified). The virtual access range data may also be dynamically generated and/or updated by the virtual beacon creator 20 and/or virtual beacon server 30 if the physical entity is mobile (i.e., capable of moving—whether or not it is stationary at any particular point in time). For example, a relatively smaller virtual access range may be generated if the physical entity moves into a densely populated environment, such as a downtown area, and a relatively larger virtual access range may be generated if the physical entity moves into in a sparsely populated environment.

In yet another embodiment, the virtual access range data may be dynamically generated based on the speed at which the physical entity is moving (e.g., larger radius if moving above a threshold speed). Alternatively, the virtual access range data may be a preset default value (e.g., a 2000 feet radius for all physical entities).

The web address/URL data may include one or more addresses of the web pages corresponding to a physical entity. Depending on the implementation, the web address/URL data may also include addresses to web pages that are suitable for a particular type of display screen (e.g., simpler or less crowded pages for a PDA display screen). In one embodiment, the virtual beacon creator 20 may automatically locate/generate relevant web address(es) and/or URL(s) based on a physical entity's name.

The tag/label data includes one or more names associated with the type of physical entity. For example, a pizzeria may have a tag/label of "restaurant." The tag/label data are useful for organizational purposes. In one embodiment, a menu of tag/label categories may be presented via the system interface 210. In another embodiment, a blank field to be filled in may be presented via the system interface 210. In yet another embodiment, a tag/label may be automatically generated by the virtual beacon creator 20.

In an exemplary embodiment, the operation time data may include the length of time that the virtual beacon service is available for a given physical entity. The length of time may be absolute or relative. As an example of the former, if a physical entity has signed up for a 6 months subscription, the operation time data may include the start and ending date of the 6 month period. As an example of the latter, the operation time data may include the hours during a day (or days of a week, etc.) when the virtual beacon service for a given physical entity is available. For example, the virtual beacon service for a museum may only be available during its hours of operation.

2. The Positioning Module

In an exemplary embodiment, if positional data are not provided via the system interface 210, then the virtual beacon creator 20 may call the positioning module 220 to detect where the physical entity is currently located and generate the positional data accordingly. The positioning module 220 may be implemented using global positioning system (GPS) or other known positioning technology.

3. The Association Module

In an exemplary embodiment, the user inputs 260 received via the system interface 210 and/or any automatically generated data (e.g., positional data generated by the positioning module 220) are provided to the association module 230. In one embodiment, the association module 230 creates an electronic file for each physical entity based on data of that physical entity.

An electronic file typically includes the data, such as the characteristic accessibility data or other data, related to a physical entity. In an exemplary embodiment, if a physical entity is not stationary (or is a physical entity), then its positional data in the electronic file may be updated from time to time. Techniques for updating the positional data will be described in more detail in Section B.5 below.

4. The Wireless Transceiver and the Web Gateway

After an electronic file is created by the association module 230, the electronic file may be sent to the virtual beacon server 30 via the wireless transceiver 240 if using the wireless communication networks 100 or via the web gateway 250 if using the wired communication networks 100. Those skilled in the art will appreciate that these and still other forms of network interface may also be used accordingly to the requirements of a particular implementation.

B. A Virtual Beacon Server

Figure 3:
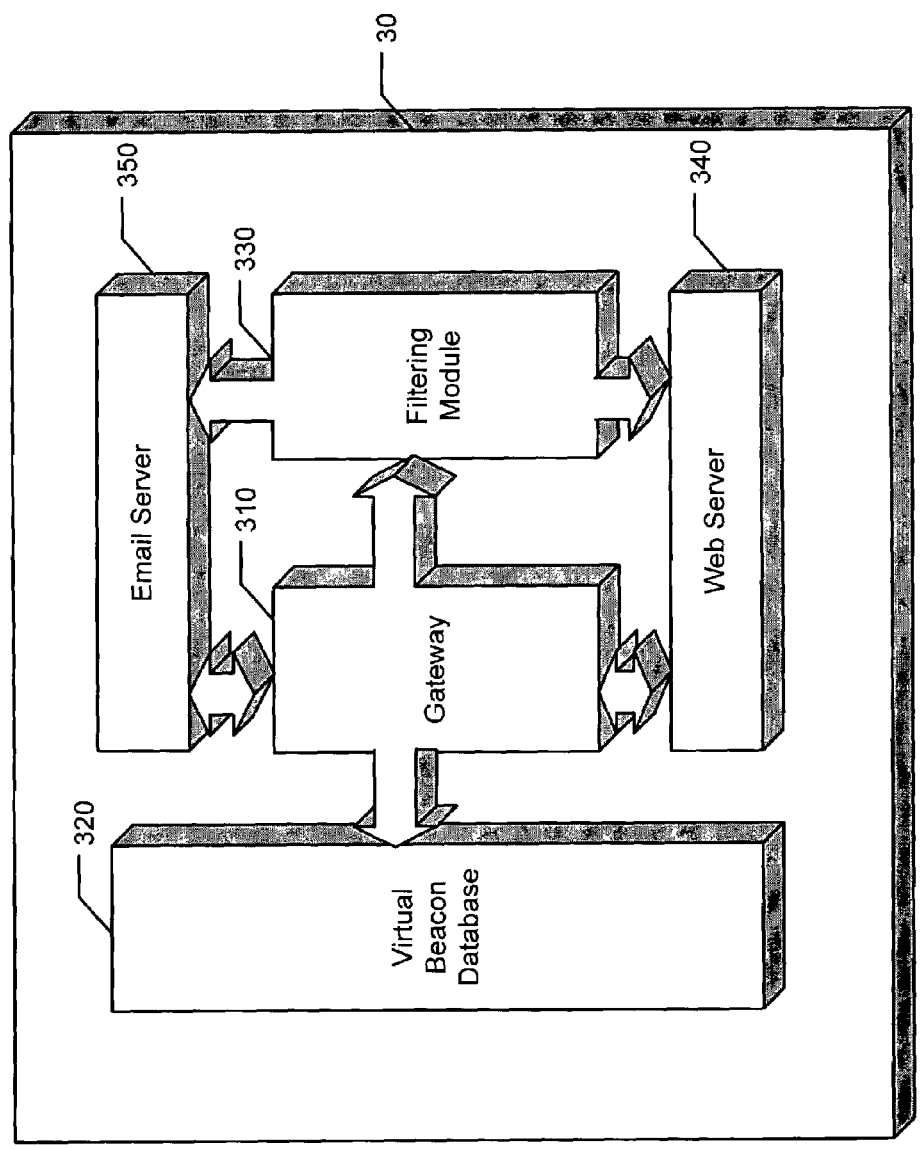
FIG. 3 illustrates a block diagram of an exemplary virtual beacon server.

FIG. 3 illustrates an exemplary virtual beacon server 30. The exemplary virtual beacon server 30 includes a gateway 310, a virtual beacon database 320, a filtering module 330, a web server 340, and/or an email server 350.

1. The Gateway

In an exemplary embodiment, the virtual beacon server 30 receives electronic files created by the virtual beacon creator 20 via the gateway 310. The electronic files may be transmitted in Extensible Markup Language (XML) format or other suitable data format(s) for transmitting over the wireless and/or wired communication networks 100. Alternatively, the virtual beacon creator 20 and the virtual beacon server 30 may reside on the same (or locally connected) computer system(s); in which case, the gateway 310 will not be necessary for receiving electronic files from the virtual beacon creator 20. In an exemplary embodiment, the virtual beacon creator 20 and the virtual beacon server 30 may be implemented by software, hardware, firmware, or a combination thereof. The software could be stored and accessed from a variety of computer-readable media including, without limitation, a hard disk, a CD, RAM (of all types), and still other electronic, magnetic and/or optical media known to those skilled in the art.

2. The Virtual Beacon Database

The electronic files received by the virtual beacon server 30 are stored in the virtual beacon database 320. The virtual beacon database 320 may be an internal database or a remote database (not shown) or a combination of both. In an exemplary embodiment, the virtual beacon server 30 may receive one or more requests from receivers 40 for electronic files stored in the virtual beacon database 320.

3. The Filtering Module

In an exemplary embodiment, the filtering module 330 may be called to select relevant electronic files in response to a request (e.g., from a receiver 40). A request from a receiver 40 may include positional data (indicating the receiver's 70 current position), orientation data (indicating the direction toward which the receiver 40 is pointing to) and/or still other forms of ranging data characteristic of the receiver (e.g., angular sweep, virtual access range, etc.). Details regarding the structures of a receiver 40 and requests made by a receiver 40 will be described in more detail in Section C below. Based on data of a request, the filtering module 330 may be called to perform one or more filtering processes.

In one exemplary filtering process, the filtering module 330 may select a set of electronic files based on the positional data of the receiver 40. For example, positional data (e.g., latitude and longitude coordinates, map grid coordinates, etc.) may indicate that the receiver 40 is in the city of Palo Alto. In this exemplary embodiment, the filtering module 330 may select all electronic files that share a common characteristic as the receiver's position. For example, these files might include entities whose coordinates also indicate that they are in Palo Alto.

In another exemplary filtering process, the filtering module 330 may narrow the search results by using the orientation data and/or other data. For example, the filtering module 330 may select a subset of electronic files from the set of electronic files using the orientation data and angular sweep. If the orientation data indicates that the receiver 40 is pointing directly to the north (e.g., toward a heading of 0 degrees) and the angular sweep is 45 degrees, then the filtering module 330 may select electronic files from the set of electronic files that have a last known location generally within a 45 degree angle centered about a northerly direction with respect to the receiver 40 (i.e., within a range from −22.5 degrees to +22.5 degrees). In one embodiment, the filtering module 330 may prioritize each electronic file in the subset of electronic files based on how the electronic file's corresponding physical entity is located to the direction in which receiver 40 is pointing.

In yet another exemplary filtering process, a request from a receiver 40 may include the receiver's specified virtual access range. The receiver's specified virtual access range is similar to the virtual access range specified by a physical entity as described above in Section A.1. That is, the virtual access range may provide a limitation to the area within which a receiver may obtain information about physical entities. In one embodiment, the filtering module 330 may select a subset of electronic files using the virtual access range. For example, if the virtual access range is 2000 feet, the filtering module 330 may select electronic files from the subset of electronic files that have a last known location generally within 2000 feet of the receiver 40.

In another exemplary filtering process, whether or not the request from a receiver 40 includes a virtual access range, the filtering module 330 may be called to review the virtual access range specified in selected electronic files. As mentioned above, during creation of the electronic files, each physical entity may have the option of specifying a virtual access range (or may be assigned an automatically generated or default virtual access range), which defines the maximum distance from its current location wherein a receiver 40 should be able to obtain information about it. Thus, in this embodiment, if the requesting receiver 40 is within a physical entity's specified virtual access range, that electronic file may be retrieved and sent to the requesting receiver.

In yet another exemplary filtering process, if a search in the virtual beacon database 320 returns no hits, the filtering module 330 may be called to check the database 320 to determine whether within a predetermined period of time (e.g., 10 minutes) any physical entity was (or will be) within the specified virtual access range of receiver 40.

Any and/or all of the foregoing filtering processes may be used, either singly or in combination. For example, one implementation could have only position data filtering, while another has a combination of virtual access range filtering plus orientation filtering.

As yet another alternative, the filtering module 330 may be an entirely optional module. In this embodiment, any or all of the filtering processes may optionally be performed by other modules or separate devices (e.g., the receiver 40), or even not at all.

4. The Web Server and Email Server

An exemplary virtual beacon server 30 has a web address and an email address, so that receivers 40 may access the virtual beacon server 30 by either address via the web server 340 or the email server 350, respectively. Alternatively, the virtual beacon server 30 may have either a web address or an email address. In this alternative embodiment, the virtual beacon server 30 may include the web server 340 or the email server 350, respectively. The important point is that the virtual beacon server 30 has one or more kinds of addressing protocols, not that they be of a specific type. Thus, still other addressing techniques will be readily usable as they are developed.

In an exemplary embodiment, the virtual beacon server 30 may receive requests from one or more receivers 40 via the web server 340 or the email server 350. In response to the requests, the virtual beacon server 30 may retrieve relevant electronic files from the virtual beacon database 320 and send the retrieved relevant electronic files to the receivers 40. In another exemplary embodiment, the virtual beacon server 30 may automatically retrieve and send relevant electronic files (i.e., as opposed to sending in response to a request) to one or more receivers 40. For example, the virtual beacon server 30 may automatically send relevant electronic files to subscribing receivers 40.

Typically, the virtual beacon server 30 may use either the web server 340 or the email server 350 to receive requests and/or send relevant electronic files. Electronic files sent via the web server 340 are typically in XML or other suitable data format for transmission across the wireless and/or wired communication networks 100. Electronic files sent via the email server 350 are typically in email formats. Whether the web server 340 or the email server 350 is used may be dependent on the request received from the receiver 40 or other reasons. For example, if the receiver 40 had sent the request in email format, the response from the virtual beacon server 30 is typically also in email format using the email server 350. The web server 340 and the email server 350 may be implemented using known web server and email server technologies.

5. Other Functions of the Virtual Beacon Server

In an exemplary embodiment, a physical entity may not necessarily be stationary. In one embodiment, a physical entity may be equipped with a positioning device or other devices that allow it to communicate its position to the virtual beacon server 30. In an exemplary embodiment, a user holding a receiver 40 may optionally itself become a physical entity. That is, the user's information may be locatable by other users in the vicinity. In another exemplary embodiment, any moving object (e.g., a bus, a banner, a dog, etc.) may also become a physical entity so long as it is capable of communicating its position to the virtual beacon server 30.

In an exemplary embodiment, a service provider maintaining the virtual beacon server 30 may need to implement one or more data updating schemes for updating the positional data of physical entities that are not stationary. In one embodiment, the updating scheme is based on characteristics of a physical entity. For example, if a physical entity moves in a predictable manner, such as in accordance to a predetermined schedule and/or along a predetermined route (e.g., a bus, ship, or train), then the service provider may require an occasional update of the current position from the predictable physical entity. Further, or alternatively, in this embodiment, the service provider may be able to predict the location of the predictable physical entity between known locations based on the known predictability.

In another example, if the physical entity is an entity that moves unpredictably or randomly, such as a person holding a receiver 40, then the updating scheme may require a more frequent (or perhaps even substantially continuous) stream of positional data from that person's receiver 40. Typically, when a receiver 40 sends a request for information, the virtual beacon server 30 uses the last known positional data of the physical entities (whether or not stationary) and retrieves the relevant electronic files accordingly. An exemplary process for implementing an updating scheme will be illustrated below in FIG. 7.

C. A Virtual Beacon Receiver

Figure 4:
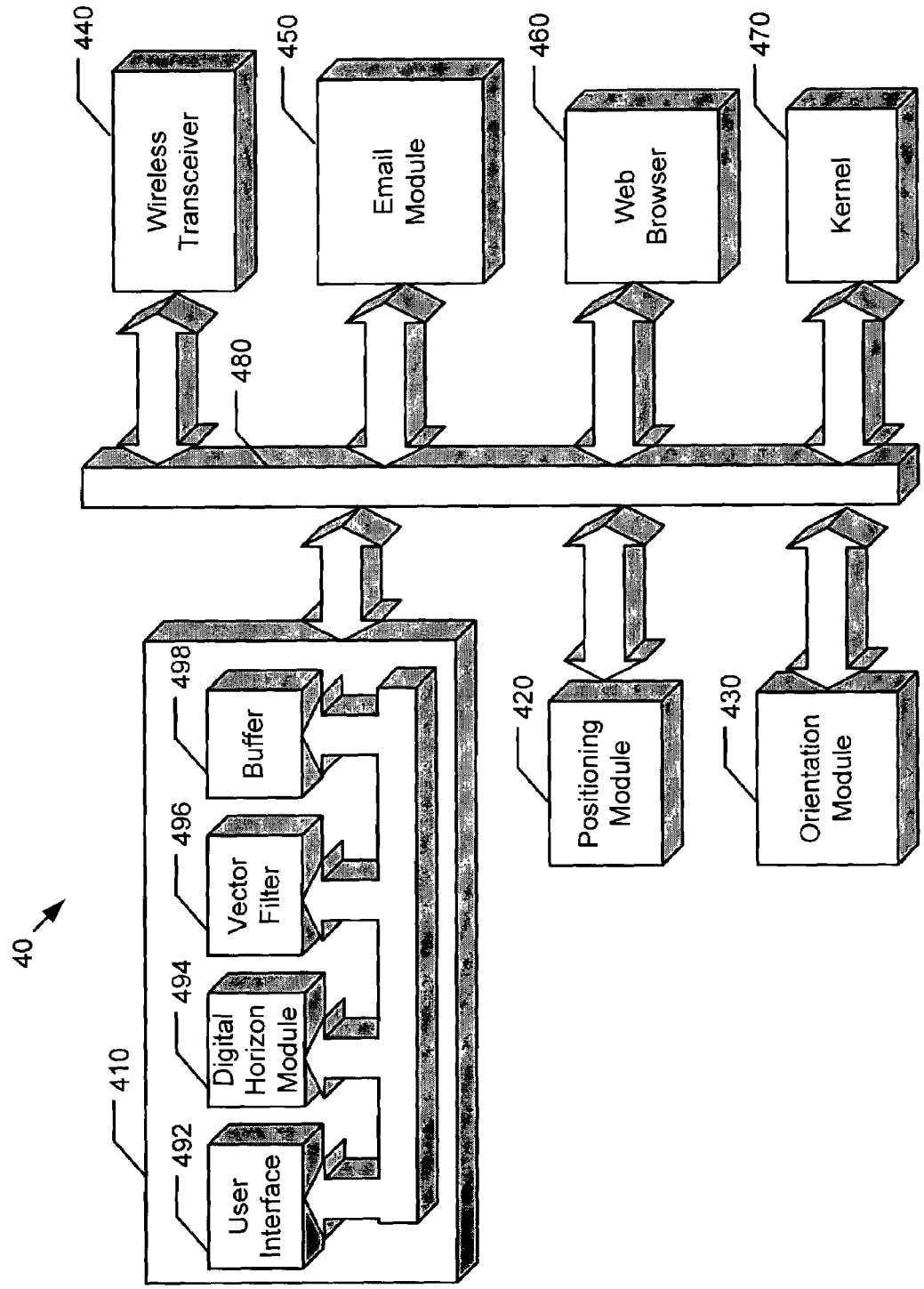
FIG. 4 illustrates a block diagram of an exemplary virtual beacon receiver.

FIG. 4 illustrates an exemplary virtual beacon receiver 40. The receiver 40 may be a PDA, personal organizer, laptop computer, palm computer, other information appliance or even smaller portable handheld electronic devices which have display, processing and/or storage resources (e.g., watches, cell phones, pagers, etc.). In this embodiment, the receiver 40 has the capability to communicate with the virtual beacon server 30 via the wireless and/or wired communication networks 100. In an exemplary embodiment, the receiver 40 includes a virtual beacon projector 410, a positioning module 420, an orientation module 430, a wireless transceiver 440, an email module 450, a web browser 460, and/or a controller 470 (e.g., a kernel). In one embodiment, these modules 410-470 can communicate with each other via one or more data buses 480.

1. The Virtual Beacon Projector

In an exemplary embodiment, an exemplary virtual beacon projector 410 includes a user interface 492, a digital horizon module 494, and/or a vector filter 496. In one embodiment, the exemplary virtual beacon projector 410 also includes a buffer 498 usable with the digital horizon module 494 and/or vector filter 496.

a. The User Interface

In an exemplary embodiment, a user of the receiver 40 may initiate a request via the user interface 492. In the prior art, the user attempts to specify a request that overlaps with certain characteristic data of the physical entities stored in the beacon system. For example, the user might use a keyword search via a search engine to find physical entities described using matching keywords. In contrast, in the techniques described herein, the users request is arbitrarily specifiable by the user independently of the actual values of the characteristic accessibility data of the candidate physical entities.

For example, if the user is standing at a street corner and would like to find out information about physical entities to the north of his/her current position, in one embodiment, the user could point his/her receiver 40 generally to the north and initiate a request to the virtual beacon server 30 via the user interface 492. Physical entities will be located even though their characteristic accessibility data do not necessarily specify that they are accessible to users with respect to which the physical entity lies in a northerly direction.

Alternatively or in addition, the user may have an option to enter characteristic ranging data, such as a virtual access range, via the user interface 492. Again, the virtual access range provides a limitation to the area in which the user wishes to receive information about. Thus, when a virtual access range is indicated, the user is limiting its request to information about physical entities within the specified distance. For example, the user could specify (or the receiver has a default value of) a 2000 feet radius as its virtual access range. The user would then receive electronic files relating to physical entities currently located within that 2000 feet radius. Again, the physical entities would be locatable even though their characteristic accessibility data do not necessarily specify that they are accessible to users with respect to which the physical entity lies less than 2000 feet away.

All of the foregoing is, of course, merely exemplary. As will be discussed below, still other forms of requests may be inputted in accordance with the needs of the user and the capabilities of the particular implementation.

b. The Digital Horizon Module

In another exemplary embodiment, a virtual access range may be generated by the digital horizon module 494 if the user does not provide one. For example, the digital horizon module 494 may generate a suitable virtual access range in an ad hoc basis. For example, if the user is in a densely populated environment (e.g., downtown), a relatively smaller virtual access range may be generated by the digital horizon module 494. Likewise, if the user is in a sparsely populated environment, a relatively larger virtual access range will be generated by the digital horizon module 494. In yet another embodiment, the digital horizon module 494 may assign a default virtual access range.

In an exemplary embodiment, the virtual access range, whether user specified, default, or generated by the digital horizon module 494, is stored in the buffer 498. When a response to a request is received from the virtual beacon server 30, the digital horizon module 494 may be called to use the stored virtual access range to filter the one or more electronic files in the response. Alternatively or in addition, the virtual access range may be sent to the virtual beacon server 30 with a request, where the filtering process is performed by the filtering module 330 at the server 30 (see FIG. 3).

In yet another exemplary embodiment, the virtual access range may not be specified by the receiver 40 at all. In this embodiment, the filtering module 330 at the virtual beacon server 30 (see FIG. 3) may be invoked to select relevant electronic files based on the receiver's positional data, orientation data, and/or other data as described above in Section B.3.

c. The Vector Filter

In an exemplary embodiment, the user may also have an option of defining the characteristic ranging data to include an angular sweep within which the user wishes to obtain information. For example, the user may indicate that he/she wishes to receive information relating to physical entities within a 45 degree angle centered about the direction he/she is pointing to (e.g., north). Thus, in this embodiment, instead of receiving information about physical entities in a circle which has a radius equal to the virtual access range, the user can limit the information to be received to a specific "slice of the pie."

In an exemplary embodiment, the vector filter module 496 may be called to automatically generate a suitable angular sweep or provide a default value. In one embodiment, the angular sweep is stored in the buffer 498 to be used to filter one or more electronic files in a response from the virtual beacon server 30. Alternatively, the angular sweep may be sent to the virtual beacon server 30 where the filtering is performed by the filtering module 330 at the server 30 (see FIG. 3).

The embodiments of the digital horizon module 494 and the vector filter 496 are, of course, merely exemplary. Still other forms of filtering modules and/or filtering processes may be implemented in accordance with the needs of the user and the capabilities of the particular implementation.

2. The Positioning Module

In an exemplary embodiment, the positioning module 420 determines the current position of the receiver 40 (e.g., longitude and latitude) and provides positional data to be included in the characteristic ranging data of a request. In an exemplary embodiment, positional data sent to the virtual beacon server 30 do not provide the exact location of the user. For example, the last 2 digits of the longitude and latitude values may be removed. This may be done so that the user may maintain his/her privacy and/or obtain a better search result. For example, the positional data may be modified to indicate only that the receiver 40 is currently in the city of Palo Alto (via known geographic coordinates of the city of Palo Alto) without disclosing the exact location in the city. In one embodiment, the positioning module 420 may be implemented using substantially the same technology as the positioning module 220 in the virtual beacon creator 20 as described above.

3. The Orientation Module

In an exemplary embodiment, the orientation module 430 determines the orientation of the receiver 40 (e.g., pointing North, 10 degrees due North of East, etc.) and provides orientation data to be included in the characteristic ranging data of a request. In an exemplary embodiment, the orientation module 430 may be implemented as a magnetometer, a magnetic compass, or other suitable orientation device.

4. The Wireless Transceiver, Web Browser and Email Module

In an exemplary embodiment, the positional data (e.g., generated by the positioning module 420), the orientation data (e.g., generated by the orientation module 430), a virtual access range, and/or angular sweep are forwarded to either the email module 450 or the web browser 460. For example, if the request is to be sent in an email format, the email module 450 may receive the data then generate a request in an email format. Likewise, if the request is to be sent in other data format, such as XML, then the web browser 460 may receive the data and generate a request in a suitable data format. In an exemplary embodiment, the generated request is sent to the virtual beacon server 30 via the wireless transceiver 440. Those skilled in the art will appreciate that these and still other forms of network interface may also be used according to the requirements of a particular implementation.

5. The Controller

In an exemplary embodiment, the controller 470 functions as a central control unit for managing software and/or hardware functions within the receiver 40. For example, the controller 470 may include functions for querying the positional module 420 for positional data, querying the orientation module 430 for orientation data, calling the digital horizon module 494, vector filter 496 to perform filtering functions, and/or other functions.

In an exemplary embodiment, the receiver 40 may receive a response to a request from the virtual beacon server 30 via the wireless transceiver 440. In one embodiment, the response includes one or more electronic files. In another embodiment, the response may include a message indicating that no matching files have been found. The response is typically passed by the wireless transceiver 440 to the email module 450 if it is in email format and to the web browser 460 if it is in other data formats. In either case, the response may be parsed and hyperlinks to relevant physical entities may be provided to the user via the user interface 492. If the response includes the message that no matching files have been found, a query may be provided to the user via the user interface 492 to adjust one or more search criteria (e.g., virtual access range, angular sweep, orientation, position, etc.).

In an exemplary embodiment, the various module in the receiver 40 may be implemented by software, hardware, firmware, or a combination thereof. The software could be stored and accessed from a variety of computer-readable media including, without limitation, a hard disk, a CD, RAM (of all types), and still other electronic, magnetic and/or optical media known to those skilled in the art.

III. Exemplary Processes

A. An Exemplary Process for Creating Electronic Files

Figure 5:
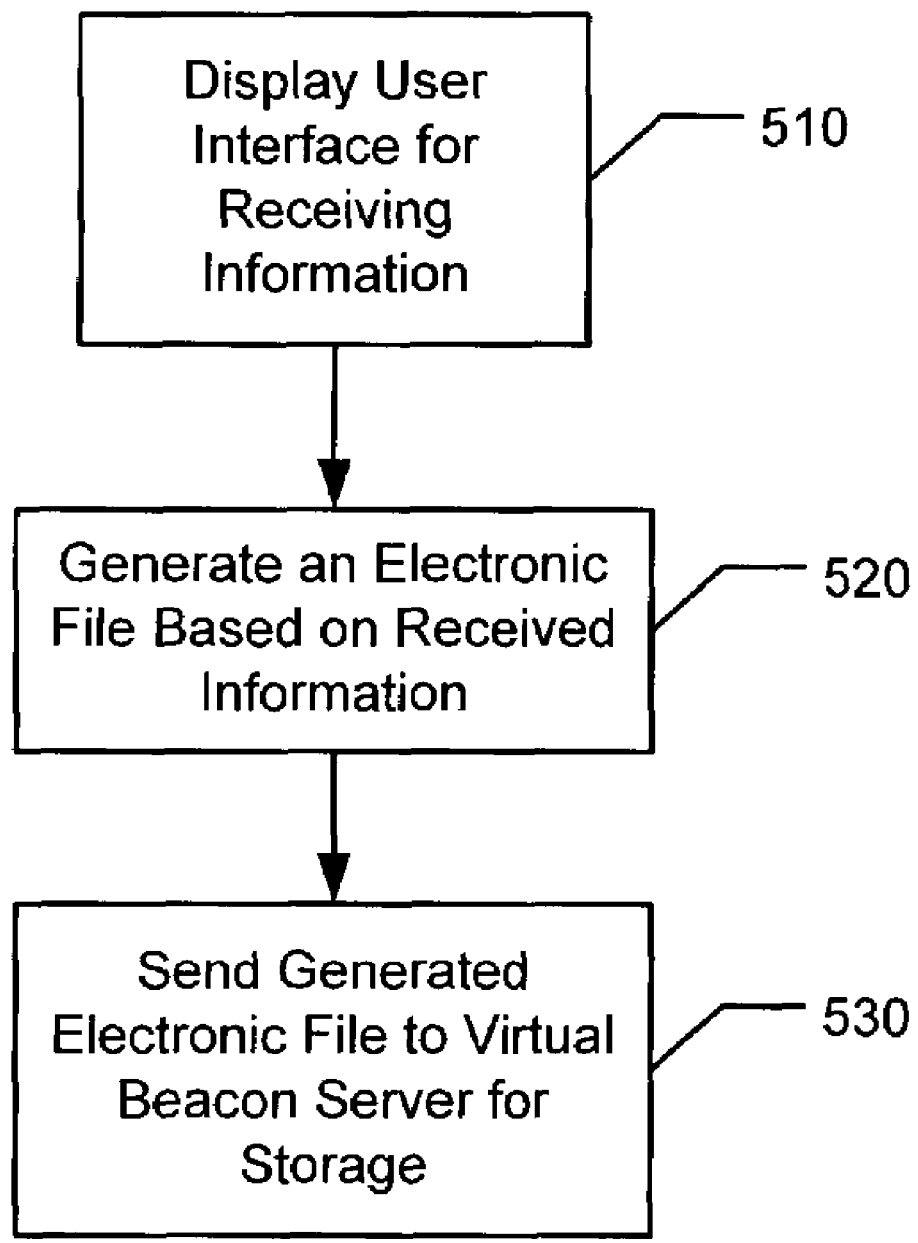
FIG. 5 illustrates a flow chart of an exemplary process for creating an electronic file to be used with the virtual beacon system.

As mentioned earlier with respect to FIG. 2, electronic files are created using a virtual beacon creator 20. FIG. 5 illustrates an exemplary process for creating electronic files. At step 510, a system interface 210 is displayed for receiving information. In an exemplary embodiment, personnel of a subscribing physical entity may have access to the system interface 210 for entering information about the physical entity. In another exemplary embodiment, personnel at the virtual beacon system 10 may enter information for the subscribing physical entities. In yet another exemplary embodiment, information about physical entities, whether or not subscribing, may be automatically generated by the virtual beacon creator 20. In one embodiment, the system interface 210 is accessible via a computing device (e.g., a desktop computer, a laptop computer, a receiver 40, etc.) that is connected to the wireless and/or wired communication networks 100, such as the internet, Intranet, or other networks.

Typically, information about a physical entity includes its name, positional data, web address/URL data, and other data. Next, an electronic file may be generated by the association module 230 based on the received and/or generated information (step 520). In an exemplary embodiment, the electronic file provides the virtual link between the physical entity and the web address/URL of the physical entity. At step 530, the generated electronic file may be sent to the virtual beacon server 30 via the wireless and/or wired communication networks 100. In an exemplary embodiment, the electronic files received by the virtual beacon server 30 are stored in the virtual beacon database 320 (see FIG. 3).

B. An Exemplary Process for Receiving and Processing a Request

Figure 6:
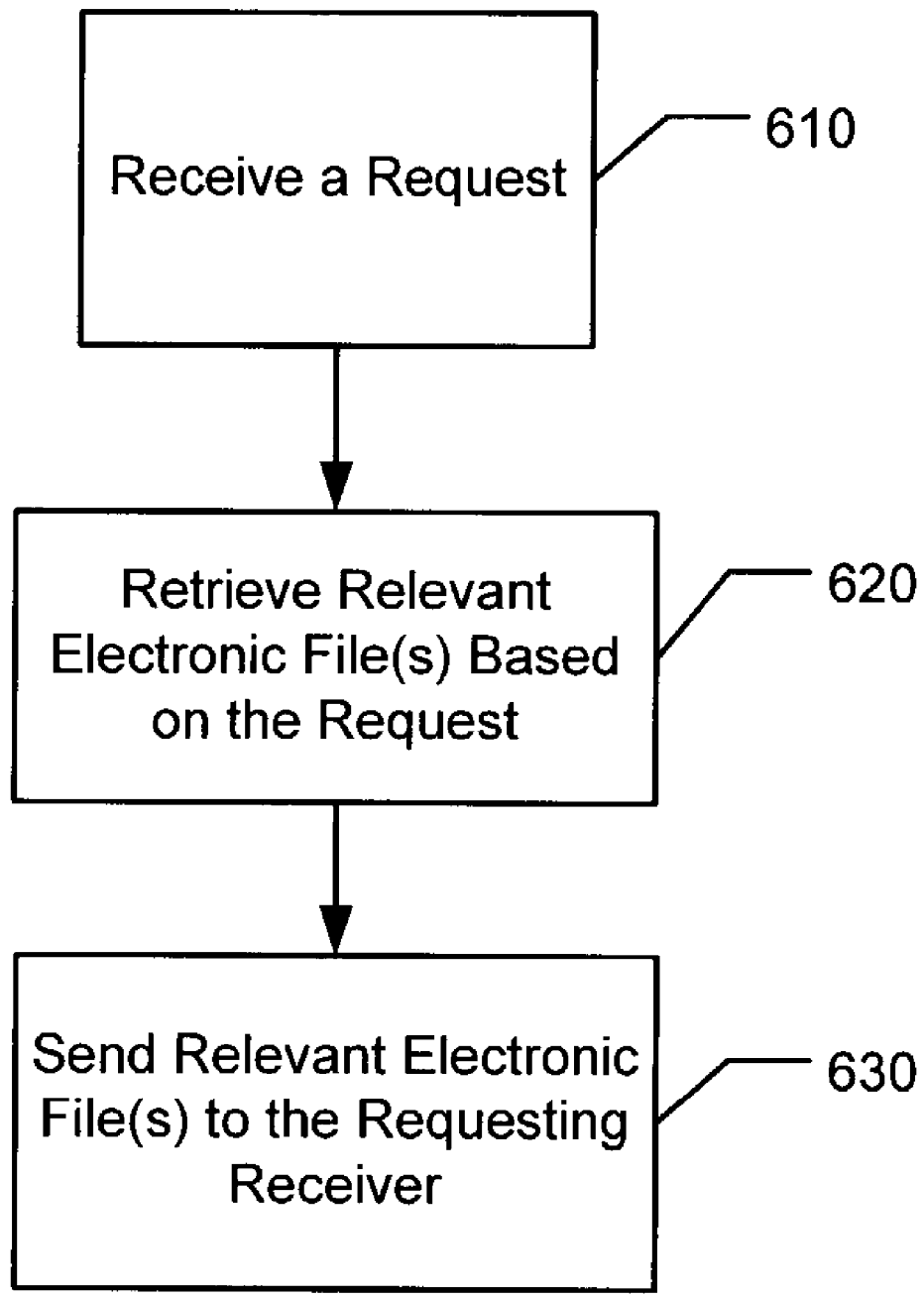
FIG. 6 illustrates a flow chart of an exemplary process for receiving and processing a request.
Figure 8:
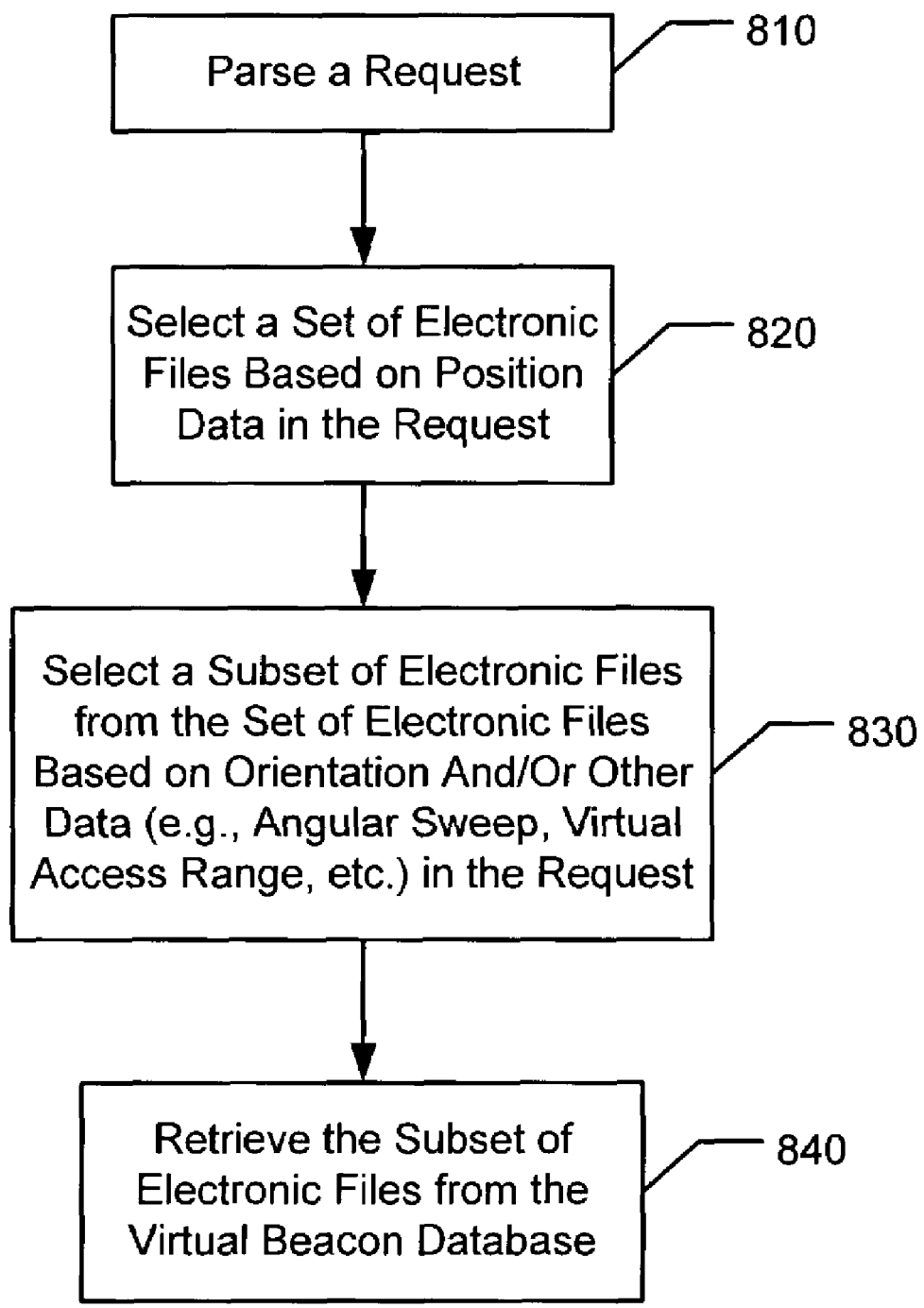
FIG. 8 illustrates a flow chart of an exemplary process for retrieving relevant electronic files in response to a request.

As mentioned earlier with respect to FIG. 3, a virtual beacon server 30 typically can receive and respond to a request from a receiver 40. FIG. 6 illustrates an exemplary process for receiving and responding to a request. At step 610, a request from a receiver 40 may be received by the virtual beacon server 30 via the gateway 310. Next, based on data in the request, relevant electronic files may be retrieved from a database, such as the virtual beacon database 320 (step 620). An exemplary process for retrieving relevant electronic files is illustrated in FIG. 8. At step 630, the virtual beacon server 30 may send the relevant electronic files to the requesting receiver 40 via the web server 340 or the email server 350.

1. An Exemplary Process for Implementing an Updating Scheme

Figure 7:
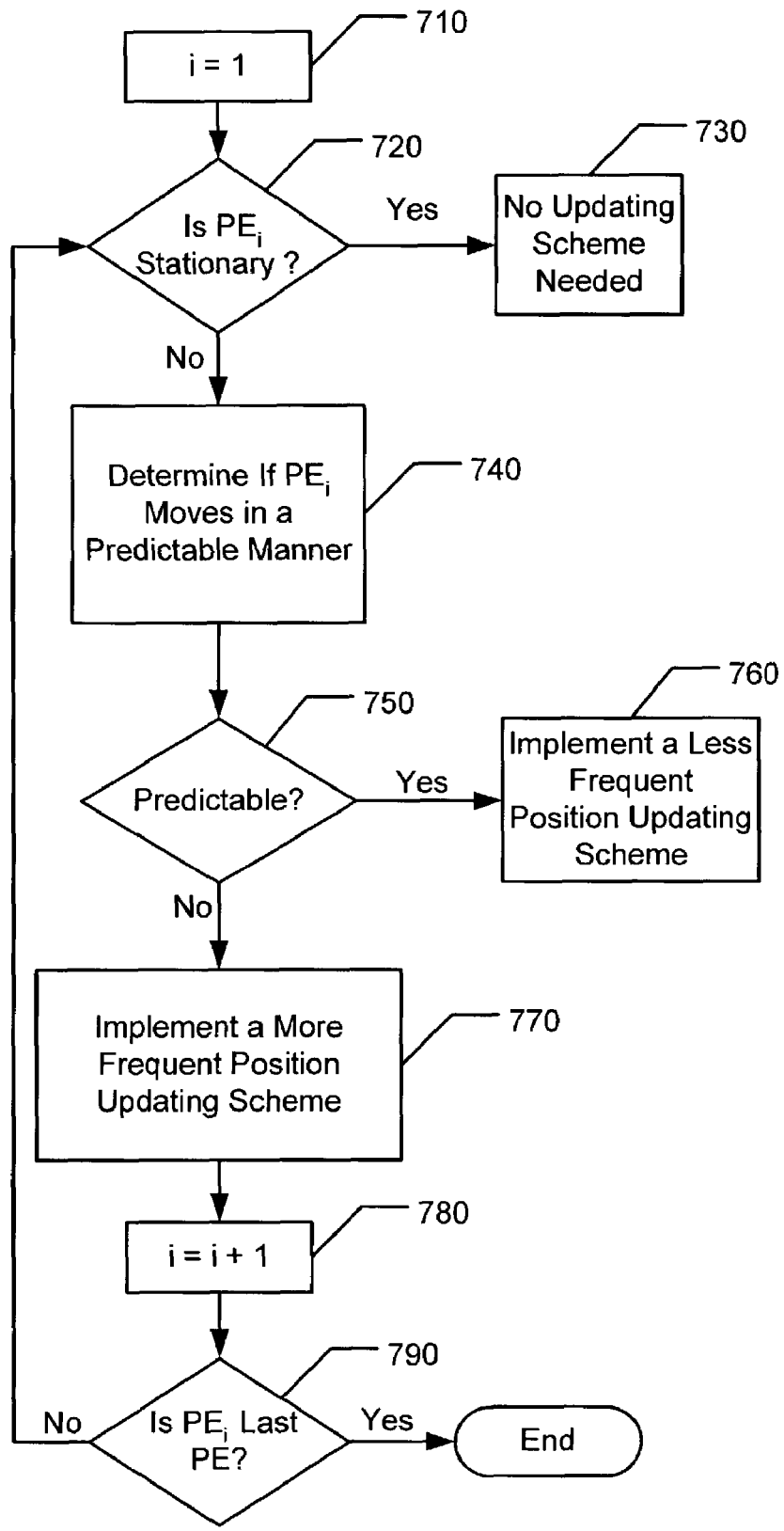
FIG. 7 illustrates a flow chart of an exemplary process for developing an updating scheme for updating electronic files.

As mentioned earlier, a virtual beacon server 30 may also be able to implement an updating scheme for updating electronic files. In particular, the virtual beacon server 30 may implement an updating scheme for updating the positional data of physical entities that are not stationary. FIG. 7 illustrates an exemplary process for implementing an updating scheme to update electronic files.

At step 710, for ease of explanation, a counter i is set to equal to 1. Next, for physical entity i (or $PE_1$), determine whether the physical entity is stationary (as opposed moving) (step 720). If $PE_i$ is stationary, no update of its positional data is necessary and the process ends (step 730). If $PE_i$ is not stationary, then determine if the physical entity moves in a predictable manner (e.g., follows a predetermined route and/or schedule) (step 740). For example, if the $PE_i$ is a bus, ship or train, then it generally follows a predictable route and/or at a predictable schedule. If the $PE_i$ moves in a predictable manner (step 750), then an occasional updating scheme (e.g., periodic, etc.) for the position of the $PE_1$ may be implemented (step 760). For example, the positional data of a bus may be updated when it stops at a bus stop. In one embodiment, the bus may be equipped with a positioning device and/or other devices, such as a receiver 40. In this embodiment, occasionally, the positioning device may be queried by the virtual beacon server 30 for the current position of the bus. In another embodiment, a computing device (e.g., a scanner) that is capable of communicating with the virtual beacon server 30 may be placed at one or more bus stops to read identification information (e.g., a bar code, etc.) of the bus (e.g., via a tag attached to the bus) and send the positional data of the bus to the virtual beacon server 30. Other known updating techniques may also be implemented. For example, see U.S. Pat. No. 6,122, 520, issued to Want et al., which is hereby incorporated by reference for all purposes.

Referring back to step 750, if the $PE_i$ is not moving in a predictable manner, then, in an exemplary embodiment, an updating scheme that requires a more frequent (or perhaps even substantially continuous) stream of position data may be implemented (step 770). Next, the counter is incremented by 1 (step 780) and the process may repeat at step 720 until an updating scheme has been implemented for all physical entities, as necessary.

2. An Exemplary Process for Retrieving Relevant Electronic Files

FIG. 8 illustrates an exemplary process for retrieving relevant electronic files in response to a request. At step 810, a request received by the virtual beacon server 30 may be parsed. In an exemplary embodiment, the request may be parsed to obtain characteristic ranging data (e.g., positional data, orientation data and/or other information) about the requesting receiver 40. Based on the positional data of the receiver, a first set of electronic files may be selected (step 820). In an exemplary embodiment, the filtering module 330 may be called to select the first set of electronic files based on the positional data of the receiver 40. Next, a subset of electronic files may be selected from the first set of electronic files based on the characteristic ranging data (e.g., orientation data, angular sweep, virtual access range and/or other data) (step 830). In an exemplary embodiment, the filtering module 330 may be called to select the subset of electronic files. Next, the subset of electronic files may be retrieved from the virtual beacon database 320 (step 840).

The use of subsets in the example above is equivalent to a logical AND operation. Those skilled in the art will readily appreciate that, in general, multiple filtering stages may be performed using any other logic scheme (e.g., OR, XOR, NOT, IF-THEN-ELSE, etc.)

In an exemplary embodiment, if no electronic file is selected in the above described process, the filtering module 330 may be called to search the positioning data of physical entities that may have been (or will be) within the vicinity of the requesting receiver 40 within a predetermined period of time. For example, if a bus was (or will be) in the vicinity of the requesting receiver 40 within the last (or next) 10 minutes, the filtering module 330 may select and retrieve the electronic file of the bus to send to the requesting receiver 40.

C. An Exemplary Process for Making a Request and Receiving a Response

Figure 9:
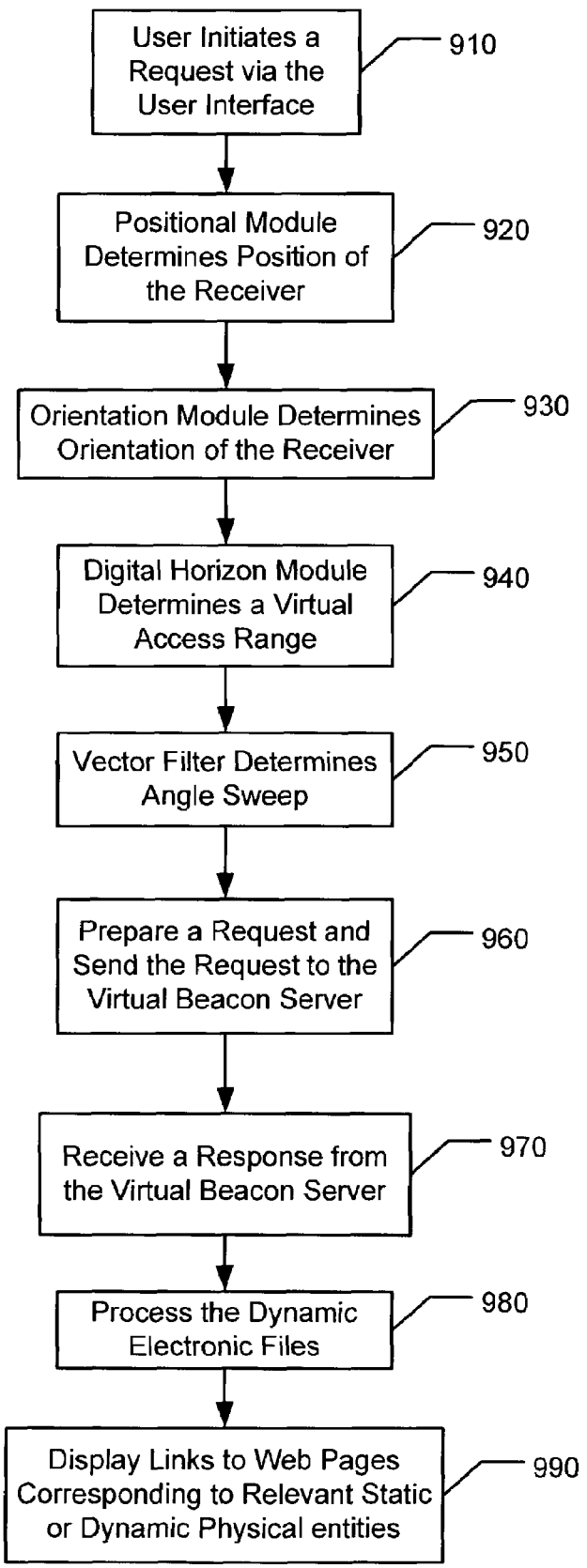
FIG. 9 illustrates a flow chart of an exemplary process for making a request and receiving a response.

As mentioned earlier with respect to FIG. 4, a receiver 40 is typically capable of making a request and/or receiving a response. FIG. 9 illustrates an exemplary process for making a request and receiving a response via the exemplary receiver 40. At step 910, a user may initiate a request via the user interface 492 of the receiver 40. Next, the positional module 420 may determine the position of the receiver 40 and generate positional data (step 920). The orientation module 430 may determine the orientation of the receiver and generate orientation data (step 930). In an exemplary embodiment, the digital horizon module 494 may be called to determine a virtual access range for the receiver 40 (step 940) and the vector filter 496 may be called to determine the relevant angular sweep for the receiver (step 950). Of course, steps 920, 930, 940, and 950 may be implemented in any sequence and/or at substantially the same time.

A request (including some or all of the above generated data) may be prepared by either the email module 450 or the web browser module 460 and sent to the virtual beacon server 30 via the wireless transceiver 440 (step 960). In an exemplary embodiment, the request may be prepared in email format by the email module 450. In another exemplary embodiment, the request may be prepared in XML or other suitable data formats by the web browser module 460.

Next, a response may be received from the virtual beacon server 30 by the wireless transceiver 440 (step 970). In an exemplary embodiment, one or more electronic files may be included in the response. In this embodiment, one or more electronic files may be processed by the receiver 40 (step 980). For example, the receiver 40 may perform filtering processes via the digital horizon module 494 and/or the vector filter 496, as necessary. In one embodiment, the receiver 40 may display hyperlinks of web pages corresponding to relevant physical entities via the user interface 492 (step 990).

In another exemplary embodiment, the response may not include any electronic files. For example, the response may be a message indicating that no electronic file was found. In this embodiment, the receiver 40 may prompt the user to modify search criteria by changing the characteristic ranging data (e.g., increase the virtual access range, change orientation, change position, etc.) via the user interface 492. If the user does modify one or more search criteria, the process may repeat at step 910.

IV. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims.

What is claimed is:

1. A method of providing data to users about physical entities of interest, comprising:
   (a) obtaining characteristic accessibility data for a plurality of candidate physical entities, said characteristic accessibility data including at least a uniform resource locator of one of said candidate physical entities;
      (i) at least one of said candidate physical entities being mobile;
      (ii) said characteristic accessibility data being used to generate an electronic file for each candidate physical entity; and
      (iii) said electronic file linking said physical entity to its corresponding web pages accessible via the Internet;
   (b) obtaining a contemporaneous search request initiated by a user for information about one or more physical entities proximate to said user's current location and of interest to said user;
      (i) said request including a search domain relative to said user's location;
      (ii) said search domain being in a form that obviates the need for said user to (A) provide a network address of, or (B) perform a keyword search for the networked data pages of, said physical entities of interest;
   (c) determining a subset of said candidate physical entities in (a) by determining which of said candidate physical entities satisfy requirements of (b); and
   (d) transmitting, to said user over an electronic network, information relating to said subset of physical entities.

2. The method of claim 1 further comprising:
   (e) updating at least one characteristic accessibility datum of at least one candidate physical entity based on a then-current position thereof.

3. The method of claim 2 where said updating occurs independently of said user request in (b).

4. The method of claim 1 wherein said transmitted information includes a user-selectable link to additional information about said subset of physical entities.

5. The method of claim 1 where said characteristic accessibility data of at least one of said candidate physical entities includes type information for said entity.

6. The method of claim 1 where said characteristic accessibility data of at least one of said candidate physical entities includes position information for said entity.

7. The method of claim 1 where at least a portion of said characteristic accessibility data is automatically generated by a device implementing said method.

8. The method of claim 1 where:
   (i) a result of said (c), based on said user's current location, is an empty subset; and
   (ii) searching for a candidate physical entity satisfying said user request at a prior point in time.

9. The method of claim 1 where:
   (i) a result of said (c), based on said user's current location, is an empty subset; and
   (ii) searching for a candidate physical entity that is likely to satisfy said user request at a future point in time.

10. The method of claim 1 where:
    (a) said user is a subscriber to a system performing said method; and
    (b) further comprising automatically transmitting information about one or more physical entities of interest to said subscriber in the absence of a contemporaneous subscriber request.

11. The method of claim 1 where:
    (i) a result of said (c) is an empty subset; and
    (ii) repeating said (b) through (d) in connection with a revised user request.

12. The method of claim 1 further comprising detecting and signaling an arrival of at least one of said candidate physical entities at a predetermined location.

13. A method of providing data to users about physical entities of interest, comprising:
    (a) obtaining characteristic accessibility data for a plurality of candidate physical entities, said characteristic accessibility data including at least a uniform resource locator of one of said candidate physical entities;

(i) at least one of said candidate physical entities being mobile;

(ii) said characteristic accessibility data of at least one of said candidate physical entities includes a range outside of which said entity will not be reported to a requesting user;

(iii) said characteristic accessibility data being used to generate an electronic file for each candidate physical entity; and (iv) said electronic file linking said physical entity to its corresponding web pages accessible via the Internet;

(b) obtaining a contemporaneous search request initiated by a user for information about one or more physical entities proximate to said user's current location and of interest to said user;

(i) said request including a search domain relative to said user's location;

(ii) said search domain being in a form that obviates the need for said user to (A) provide a network address of, or (B) perform a keyword search for the networked data pages of, said physical entities of interest;

(c) determining a subset of said candidate physical entities in (a) by determining which of said candidate physical entities satisfy requirements of (b); and (d) transmitting, to said user over an electronic network, information relating to said subset of physical entities.

14. The method of claim 13 where said range depends on an environmental density at the location of said physical entity.

15. The method of claim 13 where said range depends on a speed of said physical entity.

16. A method of providing data to users about physical entities of interest, comprising:

(a) obtaining characteristic accessibility data for a plurality of candidate physical entities, said characteristic accessibility data including at least a uniform resource locator of one of said candidate physical entities;

(i) at least one of said candidate physical entities being mobile;

(ii) said characteristic accessibility data of at least one of said candidate physical entities includes an operational time range outside of which said entity will not be reported to a requesting user;

(iii) said characteristic accessibility data being used to generate an electronic file for each candidate physical entity; and (iv) said electronic file linking said physical entity to its corresponding web pages accessible via the Internet;

(b) obtaining a contemporaneous search request initiated by a user for information about one or more physical entities proximate to said user's current location and of interest to said user;

(i) said request including a search domain relative to said user's location;

(ii) said search domain being in a form that obviates the need for said user to (A) provide a network address of, or (B) perform a keyword search for the networked data pages of, said physical entities of interest;

(c) determining a subset of said candidate physical entities in (a) by determining which of said candidate physical entities satisfy requirements of (b); and (d) transmitting, to said user over an electronic network, information relating to said subset of physical entities.

17. A method of providing data to users about physical entities of interest, comprising:

(a) obtaining characteristic accessibility data for a plurality of candidate physical entities, said characteristic accessibility data including at least a uniform resource locator of one of said candidate physical entities;

(i) at least one of said candidate physical entities being mobile;

(ii) said characteristic accessibility data being used to generate an electronic file for each candidate physical entity; and (iii) said electronic file linking said physical entity to its corresponding web pages accessible via the Internet;

(b) obtaining a contemporaneous search request initiated by a user for information about one or more physical entities proximate to said user's current location and of interest to said user;

(i) said request including a search domain relative to said user's location;

(ii) said search domain being in a form that obviates the need for said user to (A) provide a network address of, or (B) perform a keyword search for the networked data pages of, said physical entities of interest;

(iii) said user request is arbitrarily specifiable by said user independently of the actual values of said characteristic accessibility data of said candidate physical entities;

(c) determining a subset of said candidate physical entities in (a) by determining which of said candidate physical entities satisfy requirements of (b); and (d) transmitting, to said user over an electronic network, information relating to said subset of physical entities.

18. A method of obtaining data at a receiver about one or more physical entities of interest, comprising:

(a) formulating a contemporaneous search request for one or more physical entities of interest;

(i) said request including characteristic ranging data of said receiver;

(ii) said characteristic ranging data including a search domain of said receiver relative to a current location of said receiver;

(iii) said search domain being in a form that obviates the need for a user of said receiver to (A) provide a network address of, or (B) perform a keyword search for the networked data pages of, said physical entities of interest;

(b) transmitting said request to a computer server;

(i) said computer server including characteristic accessibility data for a plurality of candidate physical entities, said characteristic accessibility data including at least a uniform resource locator of one of said candidate physical entities;

(ii) at least one of said candidate physical entities being mobile;

(iii) said characteristic accessibility data being used to generate an electronic file for each candidate physical entity; and (iv) said electronic file linking said physical entity to its corresponding web pages accessible via the Internet;

(c) receiving from said computer server a subset of said candidate physical entities determined to satisfy said request.

19. The method of claim 18 further comprising receiving from said computer server a link to additional information about said subset of physical entities.

20. The method of claim 18 where:
(i) a first instance of operation of said method yields no candidate physical entities satisfying said request; and
(ii) searching for a candidate physical entity satisfying said request at a prior point in time.

21. The method of claim 18 where:
(i) a first instance of operation of said method yields no candidate physical entities satisfying said request; and
(ii) searching for a candidate physical entity that is likely to satisfy said request at a future point in time.

22. The method of claim 18 where:
(i) a first instance of operation of said method yields no candidate physical entities satisfying said request; and
(ii) repeating said method by reformulating said (a), and retransmitting said (b), prior to receiving a meaningful result in said (c).

23. The method of claim 18 where said search domain is specified, at least in part, relative to an orientation of said receiver.

24. The method of claim 18 where said search domain is specified, at least in part, relative to an angular sweep relative to said receiver.

25. The method of claim 18 where said location of said receiver is imprecisely specified within said request, to protect a user's privacy at said receiver.

26. A method of obtaining data at a receiver about one or more physical entities of interest, comprising:
(a) formulating a contemporaneous search request for one or more physical entities of interest:
   (i) said request including characteristic ranging data of said receiver;
   (ii) said characteristic ranging data including a search domain of said receiver relative to a current location of said receiver;
   (iii) said search domain being in a form that obviates the need for a user of said receiver to (A) provide a network address of, or (B) perform a keyword search for the networked data pages of, said physical entities of interest;
   (iv) said request is arbitrarily specified by said receiver independently of the actual values of said characteristic accessibility data of said candidate physical entities;
(b) transmitting said request to a computer server;
   (i) said computer server including characteristic accessibility data for a plurality of candidate physical entities, said characteristic accessibility data including at least a uniform resource locator of one of said candidate physical entities;
   (ii) at least one of said candidate physical entities being mobile;
   (iii) said characteristic accessibility data being used to generate an electronic file for each candidate physical entity; and
   (iv) said electronic file linking said physical entity to its corresponding web pages accessible via the Internet;
(c) receiving from said computer server a subset of said candidate physical entities determined to satisfy said request.

27. A virtual beacon for providing data to users about physical entities of interest, comprising:
(a) an input interface configured to receive characteristic accessibility data regarding a plurality of candidate physical entities, said characteristic accessibility data including at least a uniform resource locator of one of said candidate physical entities;
   (i) at least one of said candidate physical entities being mobile;
   (ii) said characteristic accessibility data being used to generate an electronic file for each candidate physical entity; and
   (iii) said electronic file linking said physical entity to its corresponding web pages accessible via the Internet;
(b) a network interface configured to receive a contemporaneous search request, initiated by a networked user, for information about one or more candidate physical entities proximate to said user's current location and of interest to said user;
   (i) said request including a search domain relative to said user's location;
   (ii) said search domain being in a form that obviates the need for said user to (A) provide a network address of, or (B) perform a keyword search for the networked data pages of, said physical entities of interest;
(c) an association module configured to determine a subset of said candidate physical entities in (a) by determining which of said candidate physical entities satisfy requirements of (b); and
(d) transmitting additional information about said candidate physical entities in (c) to said user over an electronic network.

28. The virtual beacon of claim 27 further comprising:
(e) a positioning module configured to determine a then-current position of at least one candidate physical entity, for use in updating at least one characteristic accessibility datum thereof.

29. The virtual beacon of claim 27 configured to search for a candidate physical entity that is likely to satisfy said user request at a different point in time, upon having determined that a result of said (c), based on said user's current location, is an empty subset.

30. A virtual beacon for providing data to users about physical entities of interest, comprising:
(a) an input interface configured to receive characteristic accessibility data regarding a plurality of candidate physical entities, said characteristic accessibility data including at least a uniform resource locator of one of said candidate physical entities;
   (i) at least one of said candidate physical entities being mobile;
   (ii) said characteristic accessibility data of at least one of said candidate physical entities includes a range outside of which said entity will not be reported to a requesting user;
   (iii) said characteristic accessibility data being used to generate an electronic file for each candidate physical entity; and
   (iv) said electronic file linking said physical entity to its corresponding web pages accessible via the Internet;
(b) a network interface configured to receive a contemporaneous search request, initiated by a networked user, for information about one or more candidate physical entities proximate to said user's current location and of interest to said user;
   (i) said request including a search domain relative to said user's location;
   (ii) said search domain being in a form that obviates the need for said user to (A) provide a network address of, or (B) perform a keyword search for the networked data pages of, said physical entities of interest;

(c) an association module configured to determine a subset of said candidate physical entities in (a) by determining which of said candidate physical entities satisfy requirements of (b); and (d) transmitting additional information about said candidate physical entities in (c) to said user over an electronic network.

31. A virtual beacon for providing data to users about physical entities of interest, comprising:
   (a) an input interface configured to receive characteristic accessibility data regarding a plurality of candidate physical entities, said characteristic accessibility data including at least a uniform resource locator of one of said candidate physical entities;
      (i) at least one of said candidate physical entities being mobile;
      (ii) said characteristic accessibility data being used to generate an electronic file for each candidate physical entity; and
      (iii) said electronic file linking said physical entity to its corresponding web pages accessible via the Internet;
   (b) a network interface configured to receive a contemporaneous search request, initiated by a networked user, for information about one or more candidate physical entities proximate to said user's current location and of interest to said user;
      (i) said request including a search domain relative to said user's location;
      (ii) said search domain being in a form that obviates the need for said user to (A) provide a network address of, or (B) perform a keyword search for the networked data pages of, said physical entities of interest;
      (iii) said user request is arbitrarily specifiable by said user independently of the actual values of said characteristic accessibility data of said candidate physical entities;
   (c) an association module configured to determine a subset of said candidate physical entities in (a) by determining which of said candidate physical entities satisfy requirements of (b); and
   (d) transmitting additional information about said candidate physical entities in (c) to said user over an electronic network.

32. A receiver for obtaining information, across a network, about one or more physical entities of interest, comprising:
   (a) an interface for obtaining a contemporaneous search request initiated by a user for one or more physical entities proximate to said user's current location and of interest;
      (i) said request including characteristic ranging data of said receiver;
      (ii) said characteristic ranging data including a search domain of said receiver relative to a location of said receiver;
      (iii) said search domain being in a form that obviates the need for a user of said receiver to (A) provide a network address of, or (B) perform a keyword search for the networked data pages of, said physical entities of interest;
   (b) a network interface for transmitting said request to a computer server;
      (i) said computer server including characteristic accessibility data for a plurality of candidate physical entities, said characteristic accessibility data including at least a uniform resource locator of one of said candidate physical entities;
      (ii) at least one of said candidate physical entities being mobile;
      (iii) said characteristic accessibility data being used to generate an electronic file for each candidate physical entity; and
      (iv) said electronic file linking said physical entity to its corresponding web pages accessible via the Internet;
   (c) receiving from said computer server a subset of said candidate physical entities determined to satisfy said request.

33. The receiver of claim 32 where said search domain is specifiable, at least in part, relative to an orientation of said receiver.

34. The receiver of claim 32 where said search domain is specifiable, at least in part, relative to an angular sweep relative to said receiver.

35. A receiver for obtaining information, across a network, about one or more physical entities of interest, comprising:
   (a) an interface for obtaining a contemporaneous search request initiated by a user for one or more physical entities proximate to said user's current location and of interest;
      (i) said request including characteristic ranging data of said receiver;
      (ii) said characteristic ranging data including a search domain of said receiver relative to a location of said receiver;
      (iii) said search domain being in a form that obviates the need for a user of said receiver to (A) provide a network address of, or (B) perform a keyword search for the networked data pages of, said physical entities of interest;
      (iv) said request is arbitrarily specifiable by said receiver independently of the actual values of characteristic accessibility data of said candidate physical entities;
   (b) a network interface for transmitting said request to a computer server;
      (i) said computer server including said characteristic accessibility data for a plurality of candidate physical entities, said characteristic accessibility data including at least a uniform resource locator of one of said candidate physical entities;
      (ii) at least one of said candidate physical entities being mobile;
      (iii) said characteristic accessibility data being used to generate an electronic file for each candidate physical entity; and
      (iv) said electronic file linking said physical entity to its corresponding web pages accessible via the Internet;
   (c) receiving from said computer server a subset of said candidate physical entities determined to satisfy said request.

36. A computer-readable storage medium for providing data to users about physical entities of interest, comprising logic instructions that, if executed:
   (a) receive characteristic accessibility data regarding a plurality of candidate physical entities, said characteristic accessibility data including at least a uniform resource locator of one of said candidate physical entities;
      (i) at least one of said candidate physical entities being mobile;

(ii) said characteristic accessibility data being used to generate an electronic file for each candidate physical entity; and (iii) said electronic file linking said physical entity to its corresponding web pages accessible via the Internet;

(b) receive a contemporaneous search request, initiated by a networked user, for information about one or more physical entities proximate to said user's current location and of interest to said user;

(i) said request including a search domain relative to said user's location;

(ii) said search domain being in a form that obviates the need for said user to (A) provide a network address of, or (B) perform a keyword search for the networked data pages of, said physical entities of interest;

(c) determine a subset of said candidate physical entities in (a) by determining which of said candidate physical entities satisfy requirements of (b); and (d) transmit additional information about said physical entities in (c) to said user over an electronic network.

37. The computer-readable storage medium of claim 36 further comprising logic instructions that, if executed:

(e) update at least one characteristic accessibility datum of at least one candidate physical entity based on a then-current position thereof.

38. The computer-readable storage medium of claim 36 where:

(i) a result of said (c), based on said user's current location, is an empty subset; and further comprising (ii) logic instructions that, if executed, search for a candidate physical entity that is likely to satisfy said user request at a different point in time.

39. A computer-readable storage medium for providing data to users about physical entities of interest, comprising logic instructions that, if executed:

(a) receive characteristic accessibility data regarding a plurality of candidate physical entities, said characteristic accessibility data including at least a uniform resource locator of one of said candidate physical entities;

(i) at least one of said candidate physical entities being mobile;

(ii) said characteristic accessibility data of at least one of said candidate physical entities includes a range outside of which said entity will not be reported to a requesting user;

(iii) said characteristic accessibility data being used to generate an electronic file for each candidate physical entity; and (iv) said electronic file linking said physical entity to its corresponding web pages accessible via the Internet;

(b) receive a contemporaneous search request, initiated by a networked user, for information about one or more physical entities proximate to said user's current location and of interest to said user;

(i) said request including a search domain relative to said user's location;

(ii) said search domain being in a form that obviates the need for said user to (A) provide a network address of, or (B) perform a keyword search for the networked data pages of, said physical entities of interest;

(c) determine a subset of said candidate physical entities in (a) by determining which of said candidate physical entities satisfy requirements of (b); and (d) transmit additional information about said physical entities in (c) to said user over an electronic network.

40. A computer-readable storage medium for providing data to users about physical entities of interest, comprising logic instructions that, if executed:

(a) receive characteristic accessibility data regarding a plurality of candidate physical entities, said characteristic accessibility data including at least a uniform resource locator of one of said candidate physical entities;

(i) at least one of said candidate physical entities being mobile;

(ii) said characteristic accessibility data being used to generate an electronic file for each candidate physical entity; and (iii) said electronic file linking said physical entity to its corresponding web pages accessible via the Internet;

(b) receive a contemporaneous search request, initiated by a networked user, for information about one or more physical entities proximate to said user's current location and of interest to said user;

(i) said request including a search domain relative to said user's location;

(ii) said search domain being in a form that obviates the need for said user to (A) provide a network address of, or (B) perform a keyword search for the networked data pages of, said physical entities of interest;

(iii) said user request is arbitrarily specifiable by said user independently of the actual values of said characteristic accessibility data of said candidate physical entities;

(c) determine a subset of said candidate physical entities in (a) by determining which of said candidate physical entities satisfy requirements of (b); and (d) transmit additional information about said physical entities in (c) to said user over an electronic network.

41. A computer-readable storage medium for obtaining information, across a network, about one or more physical entities of interest, comprising logic instructions that, if executed:

(a) obtain a contemporaneous search request initiated by a user for one or more physical entities proximate to said user's current location and of interest:

(i) said request including characteristic ranging data of said receiver;

(ii) said characteristic ranging data including a search domain of said receiver relative to a location of said receiver;

(iii) said search domain being in a form that obviates the need for a user of said receiver to (A) provide a network address of, or (B) perform a keyword search for the networked data pages of, said physical entities of interest;

(b) transmit said request to a computer server;

(i) said computer server including characteristic accessibility data for a plurality of candidate physical entities, said characteristic accessibility data including at least a uniform resource locator of one of said candidate physical entities;

(ii) at least one of said candidate physical entities being mobile;

(iii) said characteristic accessibility data being used to generate an electronic file for each candidate physical entity; and (iv) said electronic file linking said physical entity to its corresponding web pages accessible via the Internet;

(c) receive from said computer server a subset of said candidate physical entities determined to satisfy said request.

42. The computer-readable storage medium of claim 41 where said search domain is specifiable, at least in part, relative to an orientation of said receiver.

43. The computer-readable storage medium of claim 41 where said search domain is specifiable, at least in part, relative to an angular sweep relative to said receiver.

44. A computer-readable storage medium for obtaining information, across a network, about one or more physical entities of interest, comprising logic instructions that, if executed:
   (a) obtain a contemporaneous search request initiated by a user for one or more physical entities proximate to said user's current location and of interest;
      (i) said request including characteristic ranging data of said receiver;
      (ii) said characteristic ranging data including a search domain of said receiver relative to a location of said receiver;
      (iii) said search domain being in a form that obviates the need for a user of said receiver to (A) provide a network address of, or (B) perform a keyword search for the networked data pages of, said physical entities of interest;
      (iv) said request is arbitrarily specifiable by said receiver independently of the actual values of said characteristic accessibility data of said candidate physical entities;
   (b) transmit said request to a computer server;
      (i) said computer server including characteristic accessibility data for a plurality of candidate physical entities, said characteristic accessibility data including at least a uniform resource locator of one of said candidate physical entities;
      (ii) at least one of said candidate physical entities being mobile;
      (iii) said characteristic accessibility data being used to generate an electronic file for each candidate physical entity; and
      (iv) said electronic file linking said physical entity to its corresponding web pages accessible via the Internet;
   (c) receive from said computer server a subset of said candidate physical entities determined to satisfy said request.

45. A device for providing data to users about physical entities of interest, comprising:
   (a) means for receiving characteristic accessibility data regarding a plurality of candidate physical entities, said characteristic accessibility data including at least a uniform resource locator of one of said candidate physical entities;
      (i) at least one of said candidate physical entities being mobile;
      (ii) said characteristic accessibility data being used to generate an electronic file for each candidate physical entity; and
      (iii) said electronic file linking said physical entity to its corresponding web pages accessible via the Internet;
   (b) means for receiving a contemporaneous search request, initiated by a networked user, for information about one or more physical entities proximate to said user's current location and of interest to said user;
      (i) said request including a search domain relative to said user's location;
      (ii) said search domain being in a form that obviates the need for said user to (A) provide a network address of, or (B) perform a keyword search for the networked data pages of, said physical entities of interest;
   (c) means for determining a subset of said candidate physical entities in (a) by determining which of said candidate physical entities satisfy requirements of (b); and
   (d) means for transmitting additional information about said physical entities in (c)to said user over an electronic network.

46. A receiver for obtaining information, across a network, about one or more physical entities of interest, comprising:
   (a) means for obtaining a contemporaneous search request initiated by a user for one or more physical entities proximate to said user's current location and of interest:
      (i) said request including characteristic ranging data of said receiver;
      (ii) said characteristic ranging data including a search domain of said receiver relative to a location of said receiver;
      (iii) said search domain being in a form that obviates the need for a user of said receiver to (A) provide a network address of, or (B) perform a keyword search for the networked data pages of, said physical entities of interest;
   (b) means for transmitting said request to a computer server;
      (i) said computer server including characteristic accessibility data for a plurality of candidate physical entities, said characteristic accessibility data including at least a uniform resource locator of one of said candidate physical entities;
      (ii) at least one of said candidate physical entities being mobile;
      (iii) said characteristic accessibility data being used to generate an electronic file for each candidate physical entity; and
      (iv) said electronic file linking said physical entity to its corresponding web pages accessible via the Internet;
   (c) means for receiving from said computer server a subset of said candidate physical entities determined to satisfy said request.

* * * * *